US011472102B2

(12) United States Patent
Lewis et al.

(10) Patent No.: US 11,472,102 B2
(45) Date of Patent: Oct. 18, 2022

(54) CORE-SHELL NOZZLE FOR THREE-DIMENSIONAL PRINTING AND METHOD OF USE

(71) Applicants: President and Fellows of Harvard College, Cambridge, MA (US); ETH Zurich (Swiss Federal Institute of Technology), Zurich (CH)

(72) Inventors: Jennifer A. Lewis, Cambridge, MA (US); Jochen Mueller, Dornhan (DE); Jordan R. Raney, Glenside, PA (US); Kristina Shea, Zurich (CH)

(73) Assignees: President and Fellows of Harvard College, Cambridge, MA (US); ETH Zurich (Swiss Federal Institute of Technology), Zurich (CH)

( * ) Notice: Subject to any disclaimer, the term of this patent is extended or adjusted under 35 U.S.C. 154(b) by 192 days.

(21) Appl. No.: 16/467,412

(22) PCT Filed: Dec. 5, 2017

(86) PCT No.: PCT/US2017/064733
§ 371 (c)(1),
(2) Date: Jun. 6, 2019

(87) PCT Pub. No.: WO2018/106704
PCT Pub. Date: Jun. 14, 2018

(65) Prior Publication Data
US 2020/0061910 A1   Feb. 27, 2020

Related U.S. Application Data

(60) Provisional application No. 62/431,653, filed on Dec. 8, 2016, provisional application No. 62/431,723, filed on Dec. 8, 2016.

(51) Int. Cl.
*B29C 64/209* (2017.01)
*B33Y 10/00* (2015.01)
(Continued)

(52) U.S. Cl.
CPC .......... *B29C 64/209* (2017.08); *B29C 64/106* (2017.08); *B29C 64/118* (2017.08);
(Continued)

(58) Field of Classification Search
CPC ..... B29C 48/02; B29C 64/106; B29C 64/118; B29C 64/209; B33Y 10/00; B33Y 30/00
See application file for complete search history.

(56) References Cited

U.S. PATENT DOCUMENTS 5,936,861 A * 8/1999 Jang ........................ B33Y 70/00
700/98
2004/0131716 A1 7/2004 Neubauer
(Continued)

OTHER PUBLICATIONS

International Search Report and Written Opinion of the International Search Authority dated Feb. 12, 2018 in International Application No. PCT/US2017/064733 (9 pp.).

*Primary Examiner* — Manley L Cummins, IV
(74) *Attorney, Agent, or Firm* — Crowell & Moring LLP

(57) ABSTRACT

In one aspect, the present disclosure provides a nozzle for 3-D printing. The nozzle may include a first nozzle tip defining a first outlet, where the first nozzle tip includes a first channel extending therethrough. The nozzle may further include a second nozzle tip defining a second outlet, where the second nozzle tip includes a second channel extending therethrough, and where the first channel surrounds the second outlet. The second nozzle tip may be retracted longitudinally with respect to the first nozzle tip such that the second outlet of the second nozzle tip is located in the first channel.

19 Claims, 7 Drawing Sheets

(51) Int. Cl.
  *B33Y 30/00*     (2015.01)
  *B29C 64/118*    (2017.01)
  *B33Y 70/00*     (2020.01)
  *B29C 64/106*    (2017.01)
  *B33Y 80/00*     (2015.01)

(52) U.S. Cl.
  CPC ............... *B33Y 10/00* (2014.12); *B33Y 30/00* (2014.12); *B33Y 70/00* (2014.12); *B33Y 80/00* (2014.12)

(56) References Cited

U.S. PATENT DOCUMENTS

| | | |
|---|---|---|
| 2014/0061974 A1 | 3/2014 | Tyler |
| 2014/0287139 A1 | 9/2014 | Farmer et al. |
| 2015/0217517 A1 | 8/2015 | Karpas et al. |
| 2016/0046073 A1 | 2/2016 | Hadas |
| 2016/0046831 A1* | 2/2016 | Boday ................... C08J 5/04 264/401 |
| 2016/0136885 A1 | 5/2016 | Nielsen-Cole et al. |
| 2016/0297104 A1* | 10/2016 | Guillemette ............ B29B 11/16 |
| 2019/0255770 A1* | 8/2019 | Wen ........................ B05B 7/16 |

\* cited by examiner

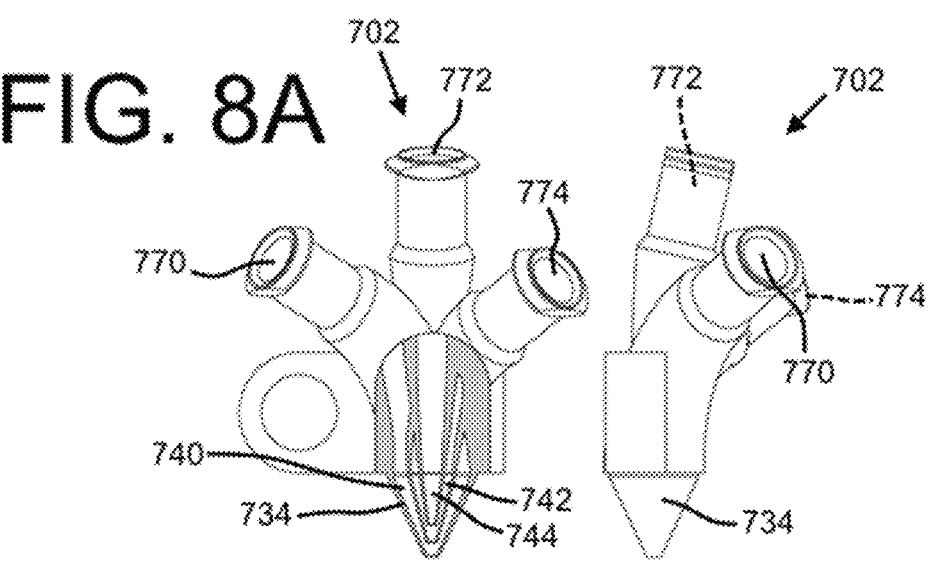

CORE-SHELL NOZZLE FOR THREE-DIMENSIONAL PRINTING AND METHOD OF USE

CROSS REFERENCE TO RELATED APPLICATIONS

This application is a filing under 35 U.S.C. § 371 of International Patent Application PCT/US2017/064733, filed Dec. 5, 2017, and claiming priority to U.S. Provisional Patent Application Ser. No. 62/431,653, filed Dec. 8, 2016 and U.S. Provisional Patent Application Ser. No. 62/431,723, filed Dec. 8, 2016. All applications listed in this paragraph are hereby incorporated by reference in their entireties.

TECHNICAL FIELD

The present disclosure is related generally to three-dimensional printing. Specifically, the present disclosure is related to systems and methods for core-shell nozzle design and three-dimensional printing using the same.

BACKGROUND

Three-dimensional ("3D") printing, also known as additive manufacturing, typically includes using a nozzle to deposit successive layers of a material under computer control. It generally encompasses a class of fabrication techniques in which structures are built in a "bottom up" mode. A 3D printer typically prints an object by depositing a material, which may be referred to herein as an "ink," on a substrate layer by layer. Depending on the ink and set-up, a printed object could be a complex, discrete 3D structure (e.g. open-cell foam lattice) that is not a layer-based 3D-printed structure.

SUMMARY

In one aspect, the present disclosure provides a nozzle for 3-D printing. The nozzle may include a first nozzle tip defining a first outlet, where the first nozzle tip includes a first channel extending therethrough. The nozzle may further include a second nozzle tip defining a second outlet, where the second nozzle tip includes a second channel extending therethrough, and where the first channel surrounds the second outlet. The second nozzle tip may be retracted longitudinally with respect to the first nozzle tip such that the second outlet of the second nozzle tip is located in the first channel.

The nozzle may further include a first wall, where an inner surface of the first wall forms the first channel. The nozzle may further include a second wall, where an inner surface of the second wall forms the second channel. The second wall may include a plurality of corrugations configured to increase a surface area of a material extruded through at least one of the first channel and the second channel. The corrugations of the second wall may be configured to increase a surface area of a material extruded through the first channel and a surface area of a material extruded through the second channel.

A diameter of the second channel at a first longitudinal location may be greater than a diameter of the second channel at a second longitudinal location, where the second longitudinal location is closer to the second nozzle tip than the first longitudinal location.

The nozzle may further include a third channel with a third nozzle tip, where the second channel surrounds the third nozzle tip, and where the third nozzle tip is retracted longitudinally with respect to the second nozzle tip such that the third nozzle tip is located within the second channel.

An outer diameter of the third channel at the third nozzle tip may be less than 250 μm. An outer diameter of the first channel at the first nozzle tip may be less than 850 μm.

BRIEF DESCRIPTION OF THE DRAWINGS

The accompanying drawings, which are incorporated in and constitute a part of this specification, illustrate embodiments consistent with the present disclosure and, together with the description.

FIG. 8A shows a perspective view of another embodiment of a core-shell nozzle module including three material inlets in accordance with the present disclosure.

FIG. 8B shows a side view of the core-shell nozzle module of FIG. 8A.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The present disclosure relates to a valved nozzle for a 3D printing system and associated methods. A nozzle suitable for 3D printing may be in the form of a line or extruded filament having an inner diameter of from about 1 μm to about 15 mm in size, and more typically from about 50 μm to about 500 μm. Depending on the injection pressure and the nozzle translation speed, the deposited material may have a diameter ranging from about 1 μm to about 20 mm, and more typically from about 100 μm (0.1 mm) to about 5 mm.

The printing process may involve extruding a filament with one or composite ink formulations. The composite ink formulation(s) fed to the one or more nozzles may be housed in separate syringe barrels that may be individually connected to a nozzle for printing by way of a Luer-Lok™ or other connector. The extrusion may take place under an applied pressure of from about 1 psi to about 200 psi, from about 10 psi to about 80 psi, or from about 20 psi to about 60 psi. The pressure during extrusion may be constant or it may be varied. By using alternative pressure sources, pressures of higher than 100 psi or 200 psi and/or less than 1 psi may be applied during printing. A variable pressure may yield a filament having a diameter that varies along the length of the extruded filament. The extrusion is typically carried out at ambient or room temperature conditions (e.g., from about 18° C. to about 25° C.) for viscoelastic ink formulations.

Figure 1:
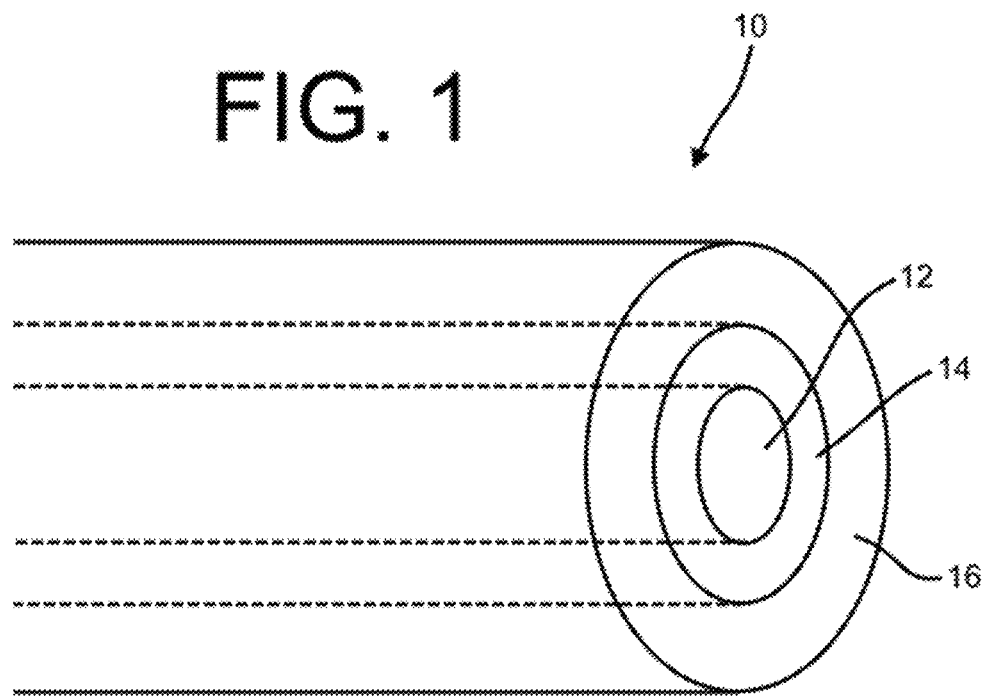
FIG. 1 shows a perspective view of a core-shell extruded filament with a core, an inner shell, and an outer shell in accordance with the present disclosure.

It may be desirable to form an extruded filament with multiple layers of material. For example, it may be desirable to form an extruded filament with a core of one material and a sheath or shell of another material. Further, referring to FIG. 1, it may be desirable to form an extruded filament 10 with a core 12, an inner shell 14, and an outer shell 16, where the outer shell 16 surrounds the inner shell 14 and the inner shell 14 surrounds the core 12. This embodiment and addition embodiments are described in detail in U.S. Provisional Patent Application Ser. No. 62/431,653, entitled "3D PRINTED CORE-SHELL FILAMENT AND METHOD OF 3D PRINTING A CORE-SHELL FILAMENT," which was filed concurrently with this application and is herein incorporated by reference in its entirety.

Figure 2:
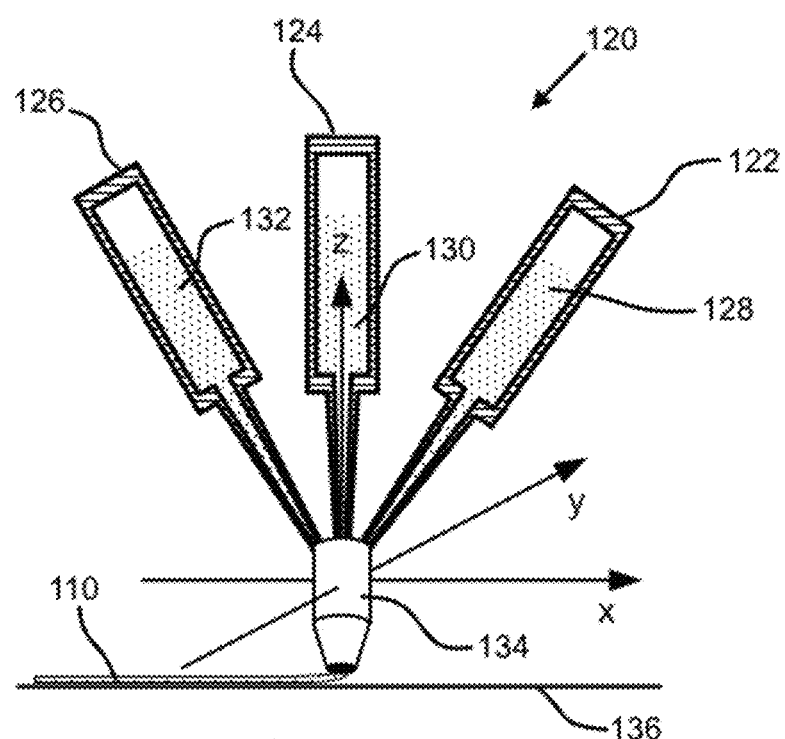
FIG. 2 shows a schematic view of a three-material system for use in a 3D printing process in accordance with the present disclosure.

FIG. 2 shows a 3D printing system 120 for forming a core-shell filament 110. The filament 110 may be a three-material filament with a core, an inner shell, and an outer shell. A first reservoir 122 may supply a first material 128 (which may be an ink formulation) for forming the outer shell to a micronozzle (herein depicted as the nozzle 134), a second reservoir 124 may supply a second material 130 to the nozzle 134 for forming the inner shell, and a third reservoir 126 may supply a third material for the core to the nozzle 134. In exemplary embodiments, the first material 128, the second material 130, and/or the third material 132 are formed of different compositions, but this is not required.

The nozzle 134 may be movable along the x-axis, the y-axis, and/or the z-axis. For example, during the extrusion of the filament 110 onto the substrate 136, the nozzle 134 may be moved along a predetermined path with respect to the substrate 136 with a positional accuracy of within ±100 μm, within ±50 μm, within ±10 μm, or within ±1 μm. Accordingly, the filaments may be deposited with a positional accuracy of within ±200 μm, within ±100 μm, within ±50 μm, within ±10 μm, or within ±1 μm. The nozzle 134 may be translated and/or rotated, and the continuous filament may be deposited at translation speeds as high as about 3 m/s (e.g., from about 1 cm/s to about 3 m/s), and more typically in the range of from about 1 mm/s to about 500 mm/s, from about 1 mm/s to about 100 mm/s, or from about 1 mm/s to about 10 mm/s.

Figure 3A:
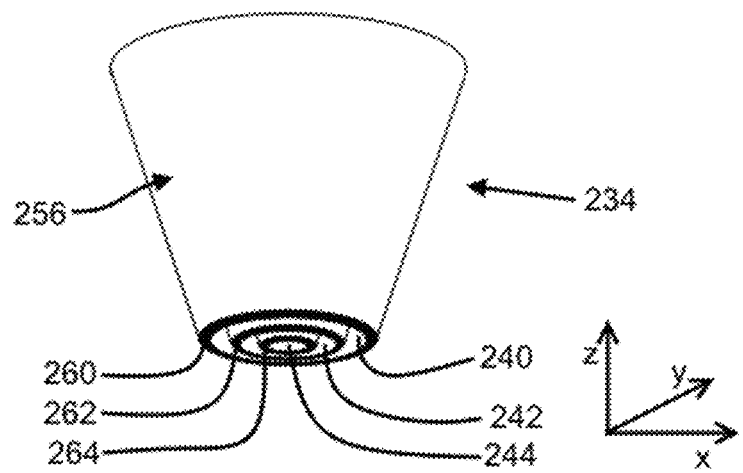
FIG. 3A shows a perspective view of a core-shell nozzle in accordance with the present disclosure.
Figure 3B:
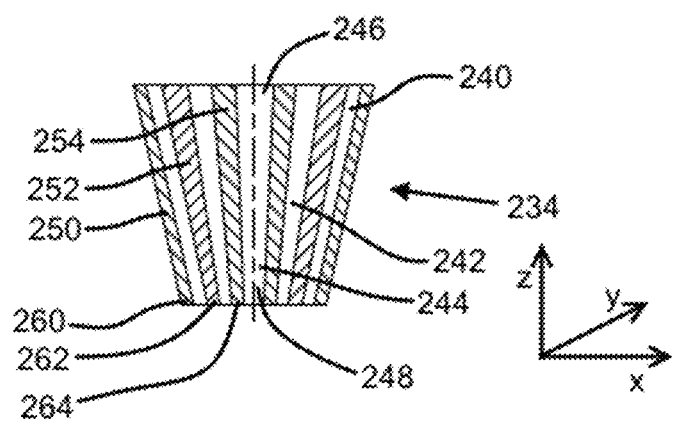
FIG. 3B shows a side cutout view of the core-shell nozzle of FIG. 3A.
Figure 3C:
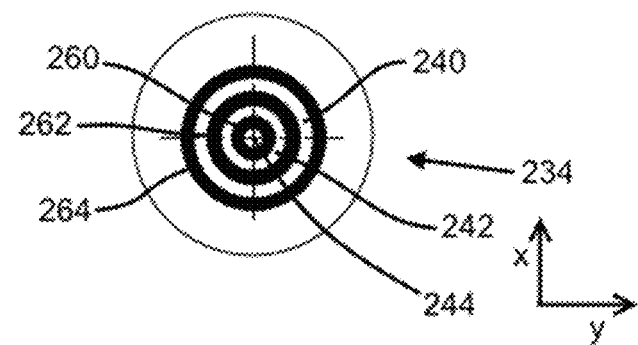
FIG. 3C shows a bottom projection view of the core-shell nozzle of FIG. 3A and FIG. 3B.

FIG. 3A shows a perspective view of a core-shell nozzle 234. FIG. 3B and FIG. 3C show a side cutout view of the core-shell nozzle and a bottom projection view of the core-shell nozzle of FIG. 3A, respectively. Referring to FIGS. 3A-3C, the depicted nozzle 234 includes a first channel 240, a second channel 242, and a third channel 244. The first channel 240 may be in the form of an annulus that surrounds the second channel 242, and the second channel 242 may be in the form of an annulus that surrounds the third channel 244. The third channel 244 may be the central core of the nozzle. The first channel 240 may correspond with an outer shell of a core-shell filament extruded from the nozzle, the second channel 242 may correspond with an inner shell, and the third channel 244 may correspond with a core of the extruded multi-layer filament. In other embodiments, the nozzle 234 may have more than or less than three channels.

As shown in FIG. 3B, an inner diameter of a first wall 250 may define the outer diameter of the first channel 240. The first wall 250 may form a first nozzle tip 260 defining a material outlet for material flowing through the first channel 240. The first wall 250 may also form an outer surface 256 of the nozzle 234. In non-limiting exemplary embodiments for three-dimensional printing, the outer diameter of the first nozzle tip 260 may be between about 500 μm and about 3000 μm, such as from about 1300 μm and about 1500 μm. The minimum inner diameter of the first channel 240 may be limited by an outer diameter of a second wall 252 (e.g., the inner diameter of the first wall 250 cannot be smaller than the outer diameter of the second wall 252 in this embodiment).

A second wall 252 may define the outer diameter of the second channel 242 and may form a second nozzle tip 262 defining a material outlet for material flowing through the second channel 242. In non-limiting exemplary embodiments, the second wall 252 may have a thickness of between about 50 μm and about 150 μm, such as about 85 μm. The outer diameter of the second nozzle tip 262 may be between about 400 μm and about 1500 μm, such as from about 750 μm to about 1000 μm. The minimum inner diameter of the second nozzle tip 262 may be limited by an outer diameter of a third wall 254.

Similarly, the third wall 254 may define the outer diameter of the third channel 244 and may form a third nozzle tip 264 defining a material outlet for material flowing through the third channel 244. In non-limiting exemplary embodiments, the third wall 254 may have a thickness of between about 50 μm and about 150 μm, such as about 85 μm. The diameter of the third nozzle tip 264 may be between about 100 μm and about 1000 μm, such as from about 150 μm to about 300 μm. While not shown and not required, the third channel 244 may surround additional channels when the nozzle 234 includes more than three channels. Alternatively, there may be additional annular channels between the first, second and third channels.

The nozzle 234 may be tapered such that the cross-sectional area of each of the channels decreases along the z-axis moving closer to the nozzle terminus (i.e., in the negative z-direction). For example, referring to FIG. 3B and the third channel 244 (but also applicable to one or more of the other channels), the cross-sectional area of the channel at a first location 246 may be greater than a cross-sectional area at a second location 248. This may be advantageous for minimizing pressure drop in the first channel 240 with respect to channels that have a constant cross-sectional area along their length (e.g., a tubular channel with a constant diameter), thereby reducing the pressure required to extrude high viscosity and/or particle-filled materials through fine outlets, for example. Potential pressure drop may be further reduced by forming the channels sinuously to provide a smooth, laminar material flow with relatively little resistance. The nozzle 234 may be formed by a 3D printing process such as stereolithography. Forming the nozzle 234 with a 3D printing process may allow for efficient manufacturing of the tapered nature of the nozzle 234. Other manufacturing processes and techniques may fail to provide the ability to form a nozzle with channels having a variable diameter at a suitable scale (e.g., typically having an inner diameter of about 1500 μm or less).

As shown, the first nozzle tip 260, the second nozzle tip 262, and the third nozzle tip 264 may be located in the same plane such that material extruded from each of the channels is extruded at the same distance from a substrate. The cross-sectional shape of each of the first channel 240, the second channel 242, and the third channel 244 may be circular, which may be advantageous for providing an extrusion of one or more materials with a stable circular cross-section. In other embodiments, the cross-section of the channels may be a shape other than circular, such as rectangular, star-shaped, triangular, or any other suitable shape.

Figure 4:
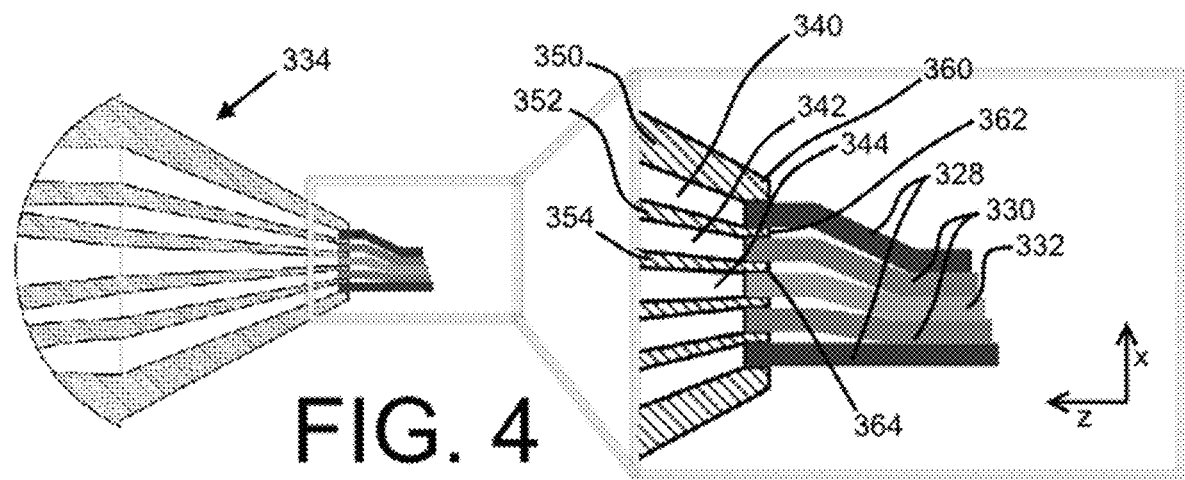
FIG. 4 shows an illustration of an extrusion process from a three-material core-shell nozzle.

FIG. 4 shows an illustration of an extrusion process from a three-material core-shell nozzle 334. The nozzle 334 may, as shown, have a first channel 340, a second channel 342, and a third channel 344 for respectively extruding a first material 328, and second material 330, and a third material 332. A first nozzle tip 360, a second nozzle tip 362, and a third nozzle tip 364 of the respective first channel 340, second channel 342, and third channel 344 may be located on the same plane. The first nozzle tip 360 may be formed by a first wall 350, the second nozzle tip 362 may be formed by a second wall 352, and the third nozzle tip 364 may be formed by a third wall 354.

As shown, when the materials are being extruded, a dead volume (also called a "gap" herein) corresponding to the thickness of the second wall 352 may be formed immediately adjacent the second nozzle tip 362. Similarly, a dead volume or gap corresponding to the thickness of the third wall 354 may be formed immediately adjacent to the third nozzle tip 364. As illustrated, this dead volume may cause the filament to include layers having unequal lengths, which may be problematic when a precise structure and material composition is required. The gaps may also cause pockets of air to form within an extruded filament. To overcome this effect, the flow rates of each of the materials may be precisely controlled. For example, the flow rate of the first material 328 through the first channel 340 may be slightly increased, and/or the flow rate of the second material 330 through the second channel 342 may be slightly decreased, etc.

Figure 5A:
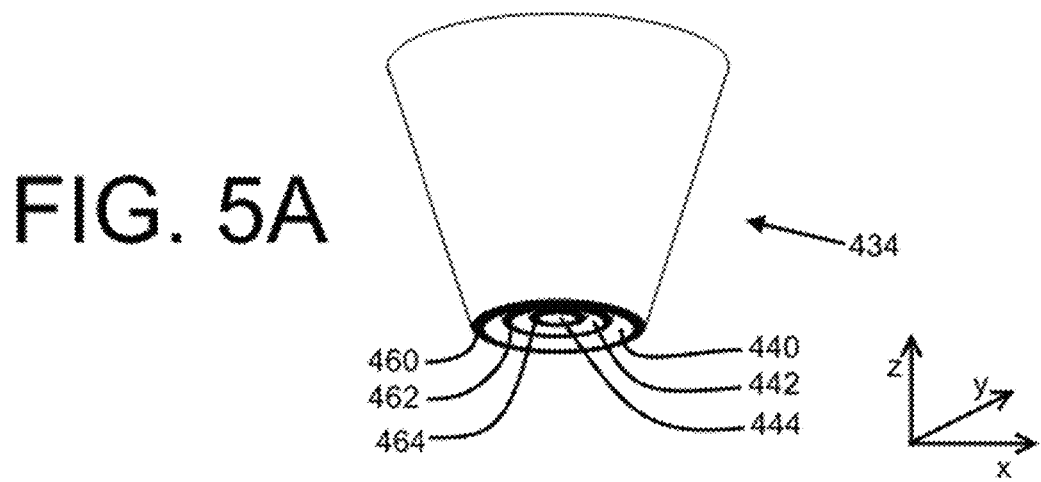
FIG. 5A shows a perspective view of a core-shell nozzle having offset tips in accordance with the present disclosure.
Figure 5B:
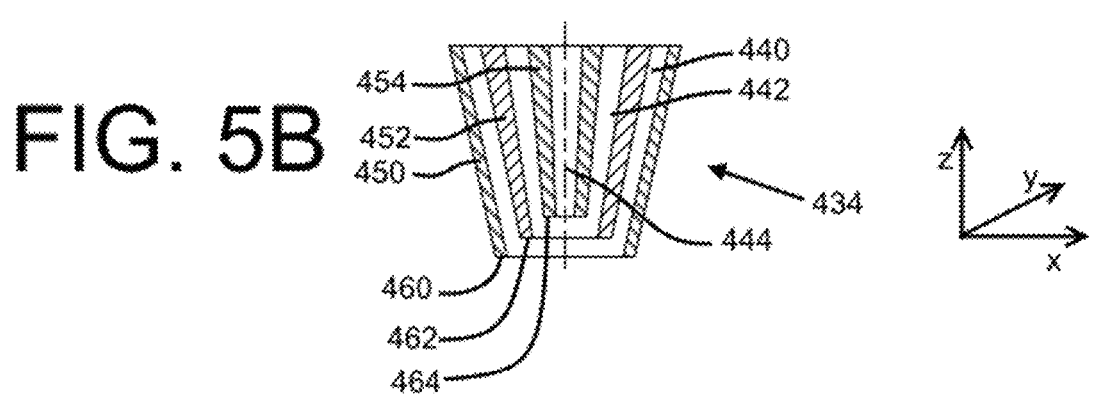
FIG. 5B shows a side cutout view of the core-shell nozzle of FIG. 5A.

In addition to, or as an alternative to, adjusting the flow rates, the effect may be overcome by using a core-shell nozzle 434 having offset outlet tips extending to different lengths as shown in FIG. 5A and FIG. 5B. Referring to FIG. 5A, the depicted nozzle 434 includes a first channel 440, a second channel 442, and a third channel 444. The first channel 440 may surround the second channel 442, and the second channel 442 may surround the third channel 444.

A first wall 450 may define the outer diameter of the first channel 440. The first wall 450 may form a first nozzle tip 460 defining a material outlet for material flowing through the first channel 440. A second wall 452 may define the outer diameter of the second channel 442 and may form a second nozzle tip 462 defining a material outlet for material flowing through the second channel 442. Similarly, a third wall 454 may define the outer diameter of the third channel 444 and may form a third nozzle tip 464 defining a material outlet for material flowing through the third channel 444.

The first wall 450 may extend further than the second wall 452 and the third wall 454 such that the first channel 440 is longer than the second channel 442 and the first nozzle tip 460 is located below the second nozzle tip 462 (with respect to the z-axis). Similarly, the second wall 452 may extend further than the third wall 454 such that the second channel 442 is longer than the third channel 444 and the second nozzle tip 462 is located below the first nozzle tip 460. In other words, the third nozzle tip 464 may be retracted within the second channel 442, and the second nozzle tip 462 may be retracted within the first channel 440.

Advantageously, having retracted inner nozzle tips may overcome issues related to dead volume. While some dead volume may exist due to the thickness of a wall of an inner nozzle tip (e.g., the third wall 454 and/or the second wall 452), dead volume may occur and then be eliminated while the material is remains in a channel of the nozzle (e.g., the first channel 440) and prior to being dispensed from the nozzle 434 altogether. For example, because the first channel 440 has a decreasing cross-sectional area moving against the z-axis, the outer shell material will be squeezed against the inner layers just prior to leaving the first channel 440, which may ensure gaps are eliminated as the filament is dispensed from the nozzle. Additionally, embodiments with one or more retracted inner nozzle tips may prevent a compounding effect of dead volume due to multiple and successive wall thicknesses (see, e.g., FIG. 4). Retracted nozzle tips may therefore have an increased level of precision with respect to other nozzle tips during an extrusion process since the different extruded layers will not move relative to one another at the moment they are dispensed from the nozzle 434, and unintended air pockets may be prevented from inclusion in the final extruded filament.

The nozzle 434 with retracted inner tips may further have the advantage of providing a core-shell filament with a smaller diameter relative to other nozzles. Referring to FIG. 5A and FIG. 5B, the third nozzle tip 464, which is associated with the inner-most third channel 444, may have a diameter defined by the inner diameter of the third wall 454, and the second nozzle tip 462 may have a diameter defined by the inner diameter of the second wall 452. Since the second nozzle tip 462 extends beyond the terminus of the third nozzle tip 464, and since the second nozzle tip 462 may be tapered such that it decreases in diameter as it extends against the z-axis, the minimum potential diameter of the second nozzle tip 462 is not necessarily limited by the outer diameter of the third wall 454. Similarly, since the first nozzle tip 460 extends beyond the terminus of the second nozzle tip 462, and since the first nozzle tip 460 may be tapered such that it decreases in diameter as it extends against the z-axis, the minimum potential diameter of the first nozzle tip 460 is not necessarily limited by the outer diameter of the second wall 452.

In one non-limiting exemplary embodiment, the inner diameter of the third nozzle tip 464 (of FIG. 5B) may be about 200 μm, the inner diameter of the second nozzle tip 462 may be about 400 μm, and the inner diameter of the first nozzle tip 460 may be about 800 μm. The diameter of the multi-material core-shell filament may therefore be about 800 μm, which may be relatively small when compared to filament extruded out of a core-shell nozzle without retracted tips on a similar scale (e.g., with a core diameter of about 200 μm). Advantageously, the relatively small diameter of the filament associated with the retracted-tip nozzle 434 may allow for greater resolution when forming a 3D-printed object.

Figure 5C:
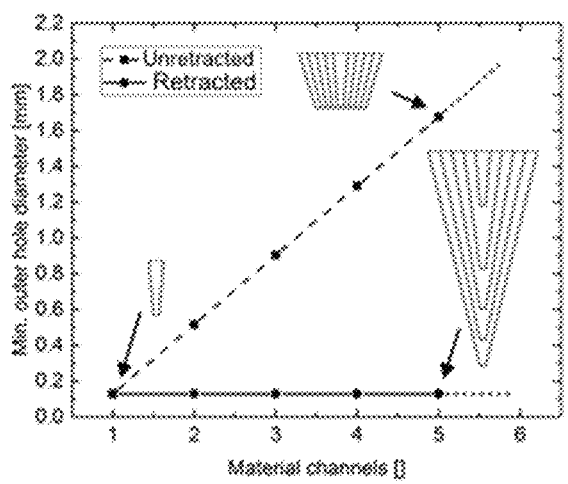
FIG. 5C shows a comparison of exemplary diameter openings of a nozzle with retracted nozzle tips and a nozzle without retracted nozzle tips.

FIG. 5C includes a chart illustrating potential exemplary minimum diameters of a nozzle with retracted nozzle tips versus diameters of a nozzle without a retracted tip (i.e., an "unretracted" nozzle). The chart assumes a minimum operational diameter of an opening of about 0.15 mm, but this is not limiting, and smaller (or larger) openings are also contemplated. As indicated by the chart, a nozzle with retracted tips may allow each material outlet, or opening, to have about the same diameter (in this case about 0.15 mm), while a nozzle with unretracted nozzle tips may require successively larger openings when moving outward from the core. While not shown in the chart, it is also contemplated that the outer-most channel of a retracted nozzle could have an opening with a smaller diameter than an inner opening.

Figure 5D:
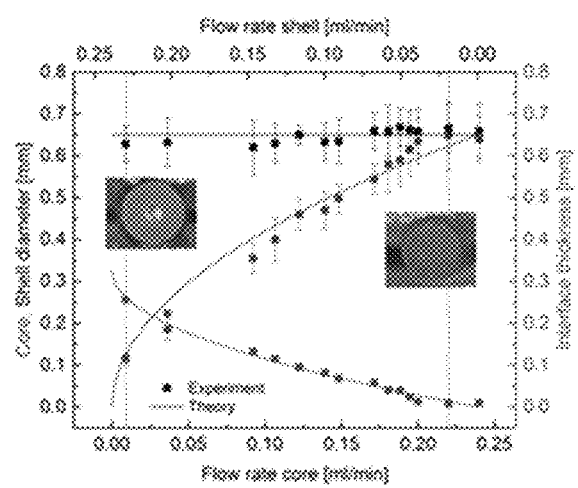
FIG. 5D shows a relationship between the flow rate of materials through respective channels of an embodiment of a core-shell nozzle during extrusion and the cross-sectional dimensions of a resulting core-shell filament.

Referring back to FIG. 5B, the first channel 440 may be associated with an outer shell of a core-shell filament, the second channel 442 may be associated with an inner shell of the filament, and the third channel 444 may be associated with a core of the filament. The tapered nozzle 434 (with retracted nozzle tips) may provide the ability to control the cross-sectional dimensions of the filament during the extrusion process by varying the flow rate and/or by varying the pressure of material flowing through the respective channels. For example, by increasing the flow rate material through the third channel 444 with respect to the flow rate through the second channel 442, the diameter of the core may increase with respect to the thickness of the inner shell (also referred to as the "interface" in FIG. 5D). An exemplary relation between the flow rate of the outer shell, flow rate of the core, the core diameter, the outer shell diameter (depicted as "shell diameter"), and inner shell diameter is shown in FIG. 5D. It is contemplated that the relative cross-sectional dimensions of the shells and core may be dynamically controlled during a 3D printing process by varying material flow rates during extrusion.

Figure 6A:
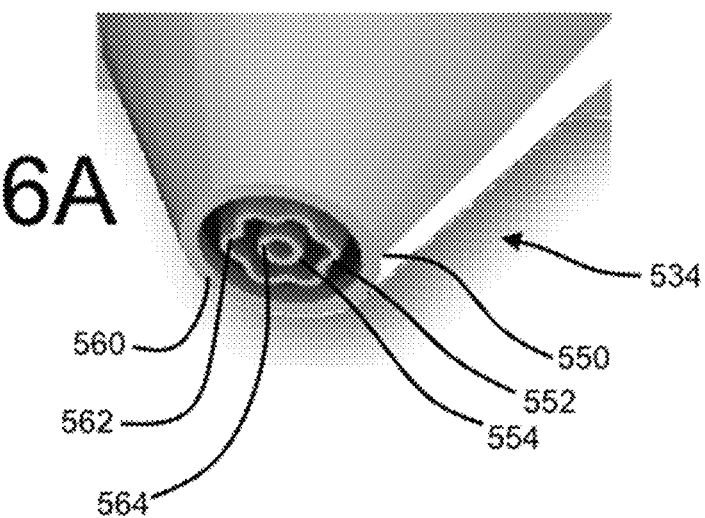
FIG. 6A shows a core-shell nozzle with corrugated inner shell in accordance with the present disclosure.
Figure 6B:
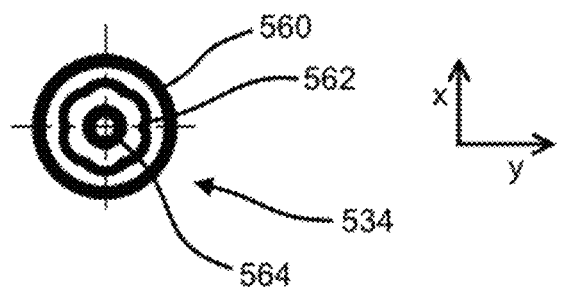
FIG. 6B shows a bottom view of the core-shell nozzle of FIG. 6A.

Referring to FIG. 6A and FIG. 6B, a core-shell nozzle 534 may include at least one wall with corrugations. As shown, the nozzle 534 includes a first wall 550 forming a first nozzle tip 560, a second wall 552 forming a second nozzle tip 562, and a third wall 554 forming a third nozzle tip 564. While not shown, one or more of the nozzle tips may be retracted (as described above with reference to FIG. 5A and FIG. 5B). In the depicted embodiment, the second wall 552 may be configured (e.g., shaped) such that the outer diameter the second tip 562 has corrugations, i.e., fluted walls. Accordingly, an outer surface of an inner shell of an associated core-shell filament will be corrugated or fluted if extruded from such nozzle. Similarly, in the depicted embodiment, an inner surface of an outer shell of the core-shell filament will be corrugated in a manner matching the corrugations of the inner shell. While not shown, it is also contemplated that the first wall 550 and/or the third wall 554 may include corrugations.

Advantageously, the corrugations may configure the nozzle 534 such that it provides a core-shell filament where two layers have an increased contact area with respect to core-shell filaments without corrugations. In other words, the outer surface area of a corrugated inner shell may be relatively large, and the inner surface area of a corrugated outer shell may be relatively large. Thus, the area of contact between the outer shell and the inner shell may be relatively large, which may be advantageous due to an increased area for bonding between layers, for example.

Figure 7:
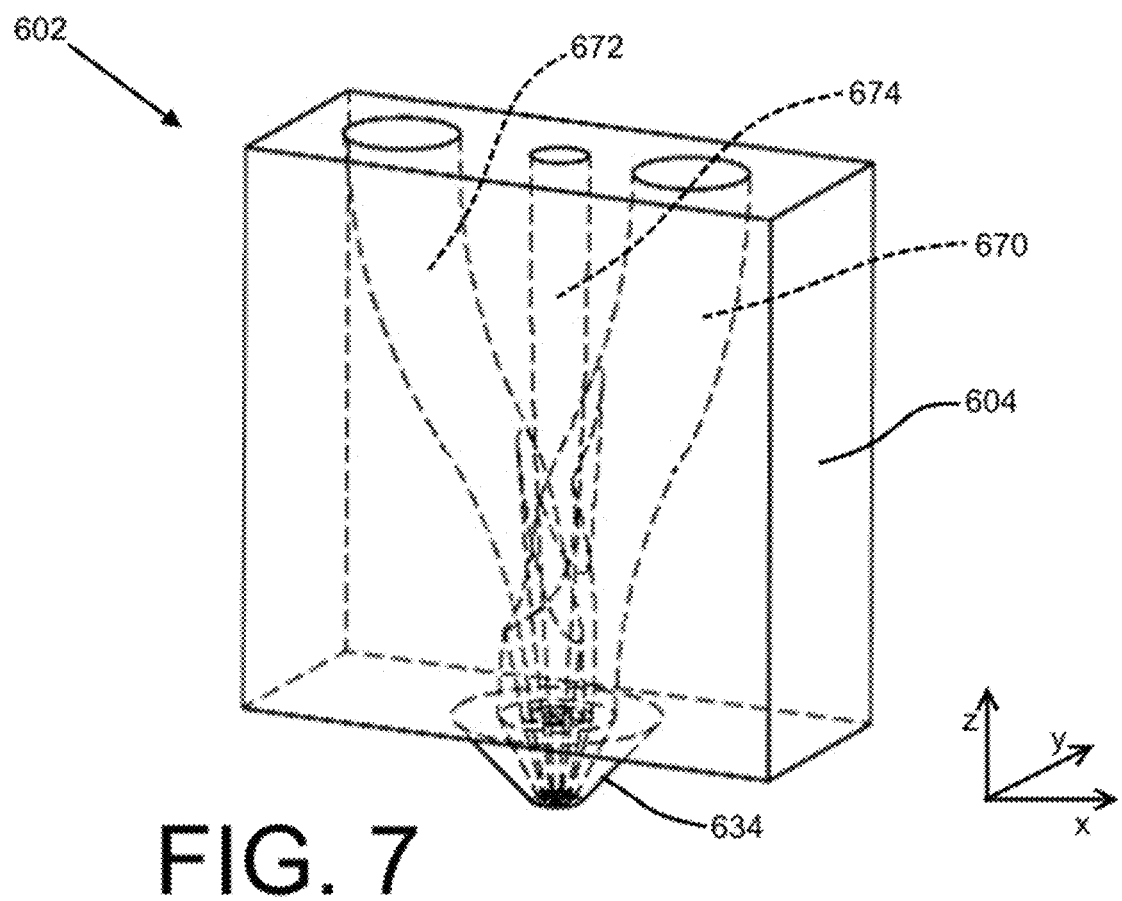
FIG. 7 shows a perspective view of an embodiment of a core-shell nozzle module including three material inlets in accordance with the present disclosure.

FIG. 7 shows a perspective view of a core-shell nozzle module 602 with a core-shell nozzle 634. The nozzle 634 may be a three-material core-shell nozzle including any of the features described above related to core-shell nozzles. A manifold body 604 may include three material inlets: a first material inlet 670 for receiving a first material (which may be the material of an outer shell of a core-shell filament), a second material inlet 672 for receiving a second material (which may be the material of an inner shell), and a third material inlet 674 for receiving a third material (which may be the material of a core). It is contemplated that more or less than three material inlets may be provided.

The first material inlet 670 may be in fluid communication with a first channel of the nozzle 634 (such as the first channel 240 of FIG. 3A), the second material inlet 672 may be in fluid communication with a second channel of the nozzle 634 (such as the second channel 242 of FIG. 3A), and the third material inlet 674 may be in fluid communication with a third channel (such as the third channel 244 of FIG. 3A). The manifold body 604 may be formed such that each of the material inlets converge on a common axis where, at the bottom of the manifold body, the first material inlet 670 surrounds the second material inlet 672 and the second material inlet 672 surrounds the first material inlet 670 in a manner matching the channels of the nozzle 634.

The manifold body 604 and/or the nozzle 634 may be formed by a 3D printing process, such as stereolithography, which may provide an inexpensive and repeatable way for producing the nozzle 634, thereby advantageously allowing the nozzle 634 to be treated as a disposable. Disposable nozzles may reduce or eliminate the need for nozzle maintenance and may reduce the risk of contamination between materials due to reusing a nozzle, for example. While not necessary, the manifold body 604 may be formed during the same stereolithography process as the nozzle 634 such that the nozzle 634 and the manifold body 604 are integral. Further, while not shown, it is contemplated that the nozzle module 602 may include more than one nozzle with each nozzle sharing or having its own material inlets, which may be advantageous for use during a massively-parallel 3D printing process as described in detail in U.S. Provisional Patent Application No. 62/431,223 and/or U.S. Provisional Patent Application No. 62/303,800, which are both herein incorporated by reference in their entirety.

Another embodiment of a core-shell nozzle module 702 with branched material inlets is shown in FIG. 8A, and a side perspective view is shown in FIG. 8B. The nozzle module 702 may include a core-shell nozzle 734, which may include any of the aspects described with respect to the embodiments above. The first material inlet 770 may be in fluid communication with a first channel 740 of the nozzle 734, the second material inlet 772 may be in fluid communication with a second channel 742 of the nozzle 734, and the third material inlet 774 may be in fluid communication with a third channel 744. The nozzle module 702 may be integrally formed as one piece (or not), and may be formed with a 3D printing process as described in more detail above. Each of the material inlets may converge on a common axis where, at the bottom of the nozzle module 702, the first material inlet 770 surrounds the second material inlet 772, and the second material inlet 772 surrounds the first material inlet 770 in a manner matching the channels of the nozzle 734.

Although the present disclosure has been described in considerable detail with reference to certain embodiments thereof, other embodiments are possible without departing from the present disclosure. The spirit and scope of the appended claims should not be limited, therefore, to the description of the preferred embodiments contained herein. All embodiments that come within the meaning of the claims, either literally or by equivalence, are intended to be embraced therein. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

The present disclosure is not limited to the exact construction that has been described above and illustrated in the accompanying drawings, and that various modifications and changes can be made without departing from the scope thereof. It is intended that the scope of the present disclosure only be limited by the appended claims.

We claim:

1. A nozzle for 3-D printing, the nozzle comprising:
a first nozzle tip defining a first outlet, the first nozzle tip defining a first channel extending through the first nozzle tip; and
a second nozzle tip defining a second outlet, the second nozzle tip defining a second channel extending through the second nozzle tip,
wherein the second channel continuously decreases in cross-sectional area for a portion of a length of the second channel as the second channel extends towards the second outlet, and wherein the first channel surrounds the second outlet,
wherein the second nozzle tip is retracted longitudinally with respect to the first nozzle tip such that the second outlet of the second nozzle tip is located in the first channel;
a first wall, wherein an inner surface of the first wall forms the first channel; and
a second wall, wherein an inner surface of the second wall forms the second channel,
wherein the second wall includes a plurality of corrugations configured to increase a surface area of a material extruded through at least one of the first channel and the second channel.

2. The nozzle of claim 1, wherein the plurality of corrugations of the second wall are configured to increase a surface area of a material extruded through the first channel and a surface area of a material extruded through the second channel.

3. The nozzle of claim 1, wherein a diameter of the second channel at a first longitudinal location is greater than a diameter of the second channel at a second longitudinal location, wherein the second longitudinal location is closer to the second nozzle tip than the first longitudinal location.

4. The nozzle of claim 1, further comprising a third channel with a third nozzle tip, wherein the second channel surrounds the third nozzle tip, and wherein the third nozzle tip is retracted longitudinally with respect to the second nozzle tip such that the third nozzle tip is located within the second channel.

5. The nozzle of claim 4, wherein an outer diameter of the third channel at the third nozzle tip is less than 250 μm.

6. The nozzle of claim 5, wherein an outer diameter of the first channel at the first nozzle tip is less than 850 μm.

7. A nozzle for 3-D printing, the nozzle comprising:
a first wall, wherein an inner surface of the first wall forms a first channel;
a second wall located at least partially in the first channel, wherein an inner surface of the second wall forms a second channel; and
a third wall located at least partially in the second channel, wherein an inner surface of the third wall forms a third channel,
wherein the second wall includes a plurality of corrugations configured to increase a surface area of a material extruded through at least one of the first channel and the second channel.

8. The nozzle of claim 7, wherein the first channel includes a first nozzle tip, wherein the second channel includes a second nozzle tip, and wherein the third channel includes a third nozzle tip, wherein the second nozzle tip is retracted longitudinally with respect to the first nozzle tip such that the second nozzle tip is located within the first channel.

9. The nozzle of claim 8, wherein the third nozzle tip is retracted with respect to the second nozzle tip such that the third nozzle tip is located within the second channel.

10. The nozzle of claim 7, wherein the plurality of corrugations of the second wall are configured to increase a surface area of a material extruded through the first channel and a surface area of a material extruded through the second channel.

11. The nozzle of claim 7, wherein a diameter of the third channel at a first location is greater than a diameter of the third channel at a second location, wherein the second location is closer to a third nozzle tip than the first location.

12. The nozzle of claim 7, wherein a diameter of the third channel at a third nozzle tip is less than 250 μm.

13. The nozzle of claim 12, wherein a diameter of the first channel at the third nozzle tip is less than 850 μm.

14. A nozzle for 3-D printing, the nozzle comprising:
a first nozzle tip defining a first outlet, the first nozzle tip defining a first channel extending through the first nozzle tip; and
a second nozzle tip defining a second outlet, the second nozzle tip defining a second channel extending through the second nozzle tip, wherein the first channel surrounds the second outlet,
wherein the second nozzle tip is retracted longitudinally with respect to the first nozzle tip such that the second outlet of the second nozzle tip is located in the first channel; and
a third channel with a third nozzle tip, wherein the second channel surrounds the third nozzle tip, and wherein the third nozzle tip is retracted longitudinally with respect to the second nozzle tip such that the third nozzle tip is located within the second channel.

15. The nozzle of claim 14, wherein an outer diameter of the third channel at the third nozzle tip is less than 250 μm.

16. The nozzle of claim 15, wherein an outer diameter of the first channel at the first nozzle tip is less than 850 μm.

17. A nozzle for 3-D printing, the nozzle comprising:
a first nozzle tip defining a first outlet, the first nozzle tip defining a first channel extending through the first nozzle tip; and
a second nozzle tip defining a second outlet, the second nozzle tip defining a second channel extending through the second nozzle tip,
wherein the second channel continuously decreases in cross-sectional area for a portion of a length of the second channel as it extends towards the second outlet, and wherein the first channel surrounds the second outlet, wherein the second nozzle tip is retracted longitudinally with respect to the first nozzle tip such that the second outlet of the second nozzle tip is located in the first channel; and a third channel with a third nozzle tip, wherein the second channel surrounds the third nozzle tip, and wherein the third nozzle tip is retracted longitudinally with respect to the second nozzle tip such that the third nozzle tip is located within the second channel.

18. The nozzle of claim 17, wherein an outer diameter of the third channel at the third nozzle tip is less than 250 μm.

19. The nozzle of claim 17, wherein an outer diameter of the first channel at the first nozzle tip is less than 850 μm.

* * * * *